Patented June 10, 1924.

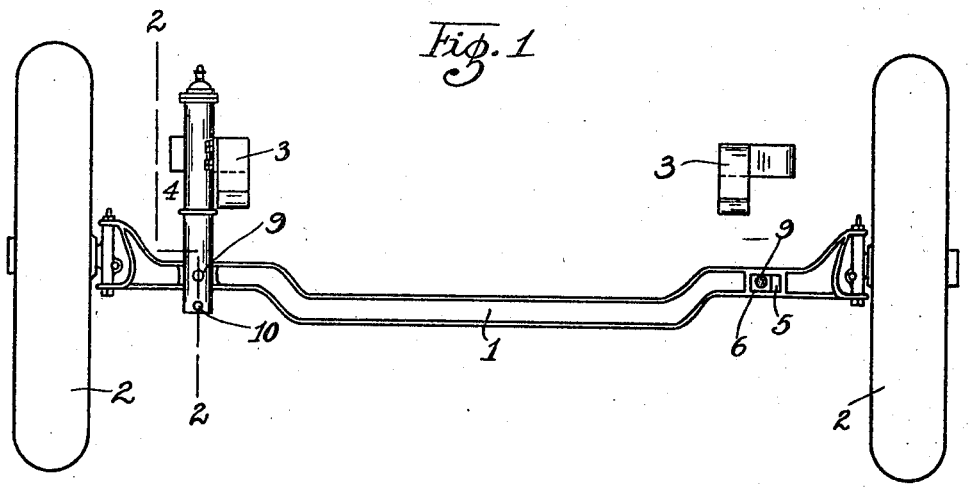
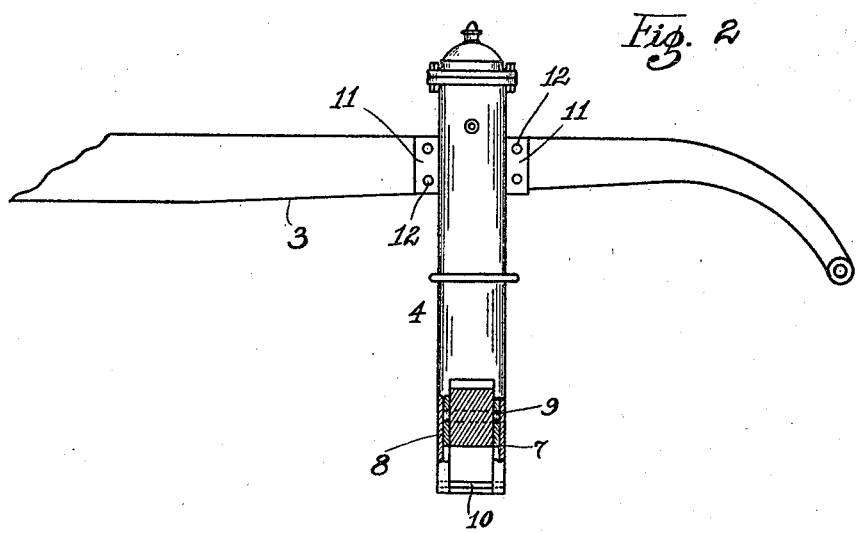

1,496,950

UNITED STATES PATENT OFFICE.

ALBERT T. SHERE, OF OAKLAND, CALIFORNIA.

AUTOMOBILE CHASSIS MOUNTING.

Application filed August 22, 1922. Serial No. 583,466.

*To all whom it may concern:*

Be it known that I, ALBERT T. SHERE, a citizen of the United States, residing at Oakland, in the county of Alameda and State of California, have invented certain new and useful Improvements in Automobile Chassis Mountings, of which the following is a specification.

My invention is an improved resilient mounting for a vehicle chassis which takes the place of the usual semi-elliptic springs upon which the chassis is mounted.

Referring to the annexed drawing in which my invention is illustrated and which forms a part of this specification:

Figure 1 is a front elevation of the front axle and wheels and the chassis of an automobile, and my mounting on which the chassis is mounted.

Figure 2 is a vertical sectional view of Figure 1 taken on line 2—2 of said figure.

In the drawing 1 indicates the front axle, 2—2 the front wheels, and 3 the chassis of an automobile.

My mounting comprises four shock absorbers 4, preferably of the combination air and oil type, two of which shock absorbers are mounted on the automobile front axle 1 and secured to the forward part of the automobile chassis 3, and the remaining two shock absorbers being mounted on the rear automobile axle and secured to the rear part of said chassis. In each axle near its ends respectively are two horizontal slots 5—5 in which are mounted horizontally slidable blocks 6—6 respectively. The lower part of the outer casing of each shock absorber is formed with a fork 7 and the lower end of the piston of each shock absorber is formed with a fork 8, both of which forks straddle an axle, the fork 8 fitting the axle closely. A pin 9 extends through the arms of each fork 8 and through a block 6 whereby the piston of each shock absorber is pivotally connected to an axle. A pin 10 extends through the lower end of the outer fork 7 of each shock absorber for engaging the under side of an axle to limit the upward movement of the chassis with relation to the axle. On the upper part of each shock absorber are formed a pair of flanges 11—11 which are secured to the chassis by bolts 12 whereby the upper part of the shock absorbers are secured to the chassis. The blocks 6 slide in slots 5 to allow one end of the axle to move up or down with relation to the other end when the wheel on said end of the axle rises and descends over irregular ground.

Having described my invention, I claim:

1. A vehicle chassis mounting comprising shock absorbers secured to the vehicle chassis and means comprising blocks to which the piston of each said shock absorber is connected, said block being slidably mounted in a slot provided in the axle whereby relative lateral motion between said piston and said axle is permitted.

2. A vehicle chassis mounting comprising shock absorbers secured to the chassis, the lower end of the outer casing of said shock absorbers being formed with a fork, the lower end of the pistons of said shock absorbers being formed with a fork, said forks straddling the vehicle axles, horizontally slidable blocks mounted in the vehicle axles, and pins extending through said blocks and through the piston forks straddling said blocks respectively.

3. A vehicle chassis mounting comprising shock absorbers secured to the chassis, the lower end of the outer casing of said shock absorbers being formed with a fork, the lower end of the pistons of said shock absorbers being formed with a fork, said forks straddling the vehicle axles, horizontally slidable blocks mounted in the automobile axles, pins extending through said blocks and through the piston forks straddling said blocks respectively, and pins extending through the lower ends of the forks of said shock absorber casings under the vehicle axles.

In testimony whereof I affix my signature.

ALBERT T. SHERE.